United States Patent Office 3,459,675
Patented Aug. 5, 1969

3,459,675
REJUVENATION OF CATALYSTS POISONED BY NITROGEN COMPOUNDS
Robert L. Crecelius, Lafayette, and Thomas J. Deahl, Orinda, Calif., assignors to Shell Oil Company, New York, N.Y., a corporation of Delaware
No Drawing. Filed May 11, 1966, Ser. No. 549,139
Int. Cl. B01j *11/02;* B01d *15/06*
U.S. Cl. 252—411                                           7 Claims

ABSTRACT OF THE DISCLOSURE

A method for rejuvenating a catalyst containing a nickel component supported on acidic refractory oxide support and deactivated by deposits of carbon and nitrogen-containing compounds by contacting the deactivated catalyst with a gas mixture containing hydrogen and from about 1 to 50% by volume hydrogen sulfide at a temperature of from about 600 to 1200° F.

---

This invention relates to a method of rejuvenating nickel-containing acidic catalysts deactivated by contact with organic nitrogen compounds.

Nickel-containing acidic composites have been and are presently used as catalytic agents for promoting a variety of chemical reactions, especially in the hydroprocesisng of petroleum oils. For example, naturally occuring or synthetic acidic composites, such as activated clays and aluminas, synthetic silica-aluminas, silica-magnesias, and the like, are widely used as a catalyst support for nickel, which has hydrogenating-dehydrogenating activity, for use in the hydrofining and hydrocracking of petroleum distillates. In such reactions, the catalysts lose some or all of their activity after a period of continued use, the rate of deactivation depending to a large extent upon the severity of conversion conditions and the feedstock employed. This loss in catalytic activity is generally attributed to two factors that occur within the reaction zone. One of the deactivation effects is due to the formation of carbonaceous deposits on the catalyst. The deactivating effect of coke is due almost entirely to the physical masking of the catalytic sites within and on the catalyst by a layer of coke. Removal of coke from a coke-deactivated catalyst can nearly always be accomplished by burning the coke in the presence of an oxygen-containing gas at elevated temperatures. This is generally referred to as regeneration.

Another type of deactivation results from the deposit and buildup of nitrogen-containing compounds on the catalyst. Petroleum fractions used as feedstock in hydrofining and hydrocracking end the like contain organic nitrogen-containing compounds varying in concentration from extremly small to extremely large quantities. Nitrogen compounds, generally basic in nature, titrate the acidic sites of the catalyst, thereby neutralizing the catalytic acidity necessary for the desired conversion reaction. Nitrogen compounds, like coke, can be removed from the catalyst by oxidation regeneration. However, as is well known, oxidative regeneration is generally detrimental to the overall life of a hydrocracking catalyst since it decreases the activity of the catalyst, so that after several regenerations, replacement of the catalyst is necessary. Non-oxidative means of rejuvenating catalytic activity obviously would be beneficial. The present invention is directed to a non-oxidative method of rejuvenating nickel-containing catalysts deactivated by organic nitrogen compounds.

In accordance with the present invention, a nitrogen compound-poisoned nickel-containing acidic catalyst is at least partially rejuvenated by a method comprising contacting said poisoned catalyst with a mixture of hydrogen and hydrogen sulfide at a temperature of about 600°–1200° F. preferably in the range from about 800–1100° F.

It should be mentioned that the present method is to be distinguished from conventional catalyst sulfiding before use, such as with fresh catalyst or a catalyst which has just been regenerated. For example, nickel-containing acid-acting refractory oxide catalysts are well known in the art for hydrocracking conversion. These nickel catalysts are usually subjected to a sulfiding treatment, such as by a mixture of hydrogen and hydrogen sulfide, before use either when fresh or following a carbon burn to remove coke deposits. The catalyst may also be sulfided by sulfur in the hydrocarbon feed, either added sulfur or naturally occurring sulfur. Thus, the catalyst to be rejuvenated by the process of the invention has already been exposed to sulfur and, therefore, contains sulfur. In contrast with conventional sulfiding of nickel-containing acidic catalysts, the present invention is concerned with the use of a mixture of hydrogen sulfide and hydrogen to remove, at least partially, deactivating deposits from the catalyst. The catalyst which is partially rejuvenated is one which is not fresh or freshly regenerated but is one which has been used in the conversion reaction and thus contains deposits of carbon and nitrogen-containing compounds.

To avoid the possibility of harming the catalyst, the amount of hydrogen sulfide in the mixture should be at least about 1% and preferably about 10% by volume. Hydrogen alone is to be avoided as prolonged contact could result in serious damage to the catalyst. Concentrations of hydrogen sulfide as high as 50% by volume or more may be used but generally a concentration of 5–20% is suitable. Rejuvenation of the catalyst with the mixture of hydrogen sulfide and hydrogen should be at an elevated temperature, i.e., about 600° F., and preferably 800° F. or higher. High temperatures apparently are more beneficial and tend to reduce the time and amount of gas necessary to effect the rejuvenation. Temperatures higher than about 1200° F. should normally be avoided so as to minimize possible damage to the catalyst. Preferably the rejuvenation treatment should be effected below 1100° F. The treatment can be effected at substantially atmospheric to considerably elevated pressures. Generally the treatment will be effected at pressures normally used in the conversion reaction, e.g., about 500–2500 p.s.i.g. The use of high pressures such as those employed in the conversion reaction, results in relatively high mass flow rates which decreases the amount of time required for the rejuvenation treatment and of course, avoids the necessity of changing pressure for rejuvenation and then readjusting the pressure to the operating level. In general, for good results the treatment is carried out until at least 100 standard cubic feet of gas is used per cubic foot of catalyst. While higher volumes of gas, e.g. up to about 100,000 s.c.f./cubic foot of catalyst and higher can be used, it is preferred to use about 1000 to 20,000 standard cubic feet per cubic foot of catalyst.

The process of the present invention is suitable for rejuvenation of nickel-containing acidic refractory oxide catalyst which are subject to deactivation by organic nitrogen compounds. The method is particularly suitable for rejuvenation of catlayst wherein at least a portion of the catalytic acidity is imparted by a siliceous component, such as for example, composites of silica with alumina, magnesia, titania zirconia and the like. Other acidic composites, such as alumina-boria, halogenated aluminas and the like can also be rejuvenated. The composites may be natural or synthetic. The amount of nickel employed in the catalyst is generally in the range from about 0.5% by weight to about 25% by weight or more, and more particularly in a range from about 1% by weight to 10% by weight. The nickel may be composited with the acidic support by any suitable means, e.g., impregnation of nickel salts onto a hydrogel or xerogel of the support, or by ion-exchange of nickel ions into a hydrogel or xerogel of the support, or by coprecipitation with the support. Nickel ion-exchanged into composites of silica and alumina, especially a hydrogel of silica-alumina, are especially suitable catalysts for rejuvenation by the process of the invention. The catalyst may contain one or more promoters, especially transitional metals such as, for example, cobalt, molybdenum, tungsten, silver, etc. or non-metallic promoters such as halogens.

Example I

A nickel hydrocracking catalyst was prepared by precipitating a hydrogel of silica-alumina (about 25% alumina), washing the hydrogel to remove contaminating ions, especially sodium, and slurrying the washed hydrogel in a solution containing nickel nitrate and ammonium fluoride. This was followed by washing, drying, and calcining at 1110° F. The final catalyst contained 5.4% by weight nickel 2.9% by weight fluorine.

The nickel catalyst was used to hydrocrack a catalytically cracked gas oil which had been previously hydrotreated to a nitrogen content of 25 p.p.m. by weight. Hydrocracking conditions were 1800 p.s.i.g., 0.67 LHSV, 10$H_2$/oil, and a temperature in the range from 550 to 700° F., adjusted as necessary to maintain a conversion of about 67%. Material boiling above 390° F. was recycled. After 130 days of operation, the catalyst contained 3.0% by weight carbon, 1.29% by weight sulfur, and 0.26% by weight N.

Experiments were conducted with three separate portions of the used catalyst. One portion was contacted with a stream of hydrogen (about 1000 s.c.f. $H_2$/cubic foot of catalyst) for two hours at 1112° F. (600° C.) and 500 p.s.i.g. Carbon and nitrogen content of the catalyst were 2.0% by weight and 0.004% by weight respectively. Another portion was treated with a mixture of hydrogen and hydrogen sulfide (10/1 $H_2$/$H_2S$) (about 1000 s.c.f. $H_2$/cubic foot of catalyst) for two hours at 1022° F. (550° C.) at atmos. pressure. Carbon and nitrogen content were 2.9% by weight and 0.020% by weight, respectively. The third portion was not treated and was retained for comparison.

The three portions were separately employed in relatively short tests to hydrocrack a catalytically cracked gas oil (425–750° F. ASTM) hydrotreated to 3 p.p.m. by weight total nitrogen. Hydrocracking conditions were 1800 p.s.i.g., 0.67 LHSV, 10/1 $H_2$/oil ratio, and a combined feed rate (ratio of fresh feed plus recycle to fresh feed) of 1.5.

The catalyst which had not been treated required a temperature of about 660° F. for a 10 day period. The catalyst treated with the $H_2$/$H_2S$ mixture required a temperature of about 640° F. for a 10 day period. The lower temperature requirement signifies a higher activity. For the hydrogen treated catalyst, a temperature of about 667° F. was required initially, but this rapidly increased, indicating a lack of stability, and at the end of 6.5 days' operation, temperature requirement had risen to 714° F. Treatment with hydrogen alone clearly is quite harmful to activity of the catalyst.

Example II

A cobalt-molybdenum catalyst was employed to hydrogenate a blend consisting of 71% by volume catalytically cracked gas oil and 29% by volume catalytically cracked clarified oil (boling <850° F.). The catalyst comprised 3.0% by weight cobalt and 7.5% by weight of molybdenum on silica-alumina cracking catalyst (about 22% by weight alumina). The hydrogenation was carried out at 1500 p.s.i.g., 1 LHSV, and 10/1 hydrogen to oil mole ratio. Temperature was adjusted as necessary to reduce nitrogen content of the feed from 0.25% by weight to 3 p.p.m. by weight. At the end of 116 days, with temeprature at 734° F. (390° C.), hydrocarbon feed was discontinued and a stream of hydrogen was passed over the catalyst for 8 hours at operating temperature and pressure and at a rate of about 1000 s.c.f. hydrogen per hour per cubic foot of catalyst. Feed was again introduced to the catalyst. Temperature requirement was lowered about 5° F. but at the end of the third day the temperature requirement returned to 734° F. Thus, there was little appreciable benefit from the hydrogen treatment of the cobalt-molybdenum catalyst.

Similarly, if a mixture of 90% hydrogen-10% hydrogen sulfide is used rather than hydrogen, no appreciable benefit is obtained.

It is readily apparent that the rejuvenation processes described herein can be utilized in many existing conversion processes where nitrogen compounds deactivate the catalyst. It is to be noted from the example above, however, that such an operation does not remove appreciable amounts of coke from the catalyst. Therefore, in catalytic processes where coke lay down on the catalyst is not a serious factor but where nitrogen compound poisoning is, the rejuvenation method of the invention can be employed as the sole reactivating process. In conversion units where both coke and nitrogen-compound deactivation is a problem, the rejuvenation method can be employed only until coke or other catalyst poisons become critical at which point conventional coke burning regeneration can be effected.

The present process is a particularly important feature in catalystic hydrocracking with nickel-containing acidic catalysts. Hydrocracking units conventionally employed today are a complex of high pressure units comprising a first-stage hydrotreatment to reduce nitrogen compounds in the feed followed by a second-stage hydrocracking reaction zone proper. As both hydrotreatment and hydrocracking reactions consume large quantities of hydrogen, hydrogen manufatcuring facilities are usually provided also. Consequently, it is a major task to shut down such a complex for carbon burn operation. In the present process, where partial rejuvenation is obtained through the removal of nitrogen compounds from the catalyst, hydrocarbon feed to the reactor can be discontinued and circulation of hydrogen containing the required amount of $H_2S$ can be established. After a relatively short period of time required to remove nitrogen compounds from the catalyst, feed can again be admitted to the reactor.

The present rejuvenation treatment can also be used in conjunction with a coke burning operation. For example, as a conversion unit is shut down for a carbon burn, treatment with the hydrogen-hydrogen sulfide mixture can be employed to remove nitrogen compounds and, to a certain extent, coke on the catalyst, as well as to purge hydrocarbons from the catalyst and the reaction zone.

We claim as our invention:

1. A non-oxidative method for rejuvenating a hydrocarbon conversion catalyst comprising an inorganic nickel component supported on a solid acidic refractory oxide support and deactivated by deposition of carbon and nitrogen-containing compounds wherein the deactivated catalyst is contacted with a gaseous mixture consisting essentially of hydrogen and hydrogen sulfide, the concentration of hydrogen sulfide being in the range from about 1 to 50%, at a temperature in the range from about 600 to 1200° F.

2. The method according to claim 1 wherein the catalyst is a siliceous cracking catalyst.

3. The method according to claim 1 wherein at least 100 standard cubic feet of gas is used per cubic foot of catalyst.

4. The method according to claim 1 wherein the catalyst is a nickel-containing siliceous cracking catalyst and the contacting is carried out at a temperature in the range from about 800 to 1100° F. with a gaseous mixture comprising hydrogen and hydrogen sulfide, the concentration of hydrogen sulfide being in the range from about 5 to 20%.

5. The method according to claim 2 wherein the catalyst has been prepared by exchanging nickel ions into a hydrogel of silica-alumina.

6. The method according to claim 4 wherein from about 1000 to 20,000 standard cubic feet of gas is used per cubic foot of catalyst.

7. The method according to claim 5 wherein at least 100 standard cubic feet of gas is used per cubic foot of catalyst.

References Cited

UNITED STATES PATENTS 2,150,923  3/1939  Houdry _____ 196—52

FOREIGN PATENTS 646,021  6/1962  Canada.

PATRICK P. GARVIN, Primary Examiner